United States Patent
Tobiyama et al.

(10) Patent No.: US 11,811,659 B2
(45) Date of Patent: Nov. 7, 2023

(54) IDENTIFICATION DEVICE AND IDENTIFICATION PROGRAM

(71) Applicant: NIPPON TELEGRAPH AND TELEPHONE CORPORATION, Tokyo (JP)

(72) Inventors: Shun Tobiyama, Musashino (JP); Shohei Araki, Musashino (JP); Bo Hu, Musashino (JP); Kazunori Kamiya, Musashino (JP); Masaki Tanikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 342 days.

(21) Appl. No.: 17/424,891

(22) PCT Filed: Feb. 13, 2020

(86) PCT No.: PCT/JP2020/005652
§ 371 (c)(1),
(2) Date: Jul. 22, 2021

(87) PCT Pub. No.: WO2020/175165
PCT Pub. Date: Sep. 3, 2020

(65) Prior Publication Data
US 2022/0086088 A1    Mar. 17, 2022

(30) Foreign Application Priority Data
Feb. 27, 2019   (JP) .................................. 2019-034936

(51) Int. Cl.
*H04L 12/741* (2013.01)
*H04L 45/745* (2022.01)
(Continued)

(52) U.S. Cl.
CPC ............. *H04L 45/745* (2013.01); *G06N 3/08* (2013.01); *H04L 12/4645* (2013.01); *H04L 47/2475* (2013.01)

(58) Field of Classification Search
CPC ............... H04L 45/745; H04L 12/4645; H04L 47/2475; H04L 63/0236; H04L 63/0245;
(Continued)

(56) References Cited

U.S. PATENT DOCUMENTS 8,682,812 B1 * 3/2014 Ranjan .................. H04L 43/028
706/12
2021/0135997 A1 * 5/2021 Tigli ..................... H04L 41/145

FOREIGN PATENT DOCUMENTS

JP    2012105043 A  *  5/2012

OTHER PUBLICATIONS

Karagiannis et al., "BLINC: Multilevel Traffic Classification in the Dark", ACM Sigcomm, Aug. 21-26, 2005, 12 pages.
(Continued)

*Primary Examiner* — Vinncelas Louis
(74) *Attorney, Agent, or Firm* — XSENSUS LLP (57) ABSTRACT

A signature generation unit (132) generates a signature in which header information of packet data included in traffic data is correlated with a label representing a category for an application corresponding to the packet data. A flow data generation unit (131) generates flow data from the packet data. An assigning unit (134) assigns the label to the flow data on the basis of the signature and the header information of the flow data. A calculation unit (135) calculates a feature amount of the flow data. A learning unit (136) learns a model for predicting a label from the feature amount using the label and the feature amount of the flow data to which the label is assigned.

7 Claims, 7 Drawing Sheets

(51) Int. Cl.
*G06N 3/08* (2023.01)
*H04L 47/2475* (2022.01)
*H04L 12/46* (2006.01)

(58) Field of Classification Search
CPC ....... H04L 67/63; H04L 69/22; H04L 43/028; H04L 41/145; G06N 3/08
See application file for complete search history.

(56) References Cited

OTHER PUBLICATIONS

Chen et al., "Seq2Img: A Sequence-to-Image based Approach Towards IP Traffic Classification using Convolutiona Neural Networks", 2017 IEEE International Conference on Big Data (BIGDATA), Dec. 11, 2017, pp. 1271-1276.

* cited by examiner

| SOURCE IP ADDRESS | SOURCE PORT | DESTINATION IP ADDRESS | DESTINATION PORT | LABEL |
|---|---|---|---|---|
| 192.0.2.10 | 80 | 192.0.2.20 | 32768 | Video |
| 192.0.2.50 | 80 | 192.0.2.60 | 50003 | SNS |
| 198.51.100.10 | 443 | 198.51.100.15 | 37003 | Cloud |
| 198.51.100.20 | 80 | 198.51.100.25 | 37002 | Mail |
| ... | ... | ... | ... | ... |

IDENTIFICATION DEVICE AND IDENTIFICATION PROGRAM

CROSS-REFERENCE TO RELATED APPLICATIONS

The present application is based on PCT filing PCT/JP2020/005652, filed Feb. 13, 2020, which claims priority to JP 2019-034936, filed Feb. 27, 2019, the entire contents of each are incorporated herein by reference.

TECHNICAL FIELD

The present invention relates to an identification device and an identification program.

BACKGROUND ART

Conventionally, a method for analyzing traffic data has been known. For example, a method of assigning a label representing a protocol to flow data using information of packet data is known (see, for example, NPL 1). Further, a method of analyzing features extracted from traffic data by a DNN (Deep Neural Network) is known (see, for example, NPL 2).

CITATION LIST

Non Patent Literature

[NPL 1] Thomas Karagiannis, Konstantina Papagiannaki, Michalis Faloutsos, BLINC: Multilevel Traffic Classification in the Dark.
[NPL 2] Zhitang Chen, Ke He, Jian Li and Yanhui Geng, Seq2Img: A Sequence-to-Image based Approach Towards IP Traffic Classification using Convolutional Neural Networks, 2017 IEEE International Conference on Big Data (BIGDATA).

SUMMARY OF THE INVENTION

Technical Problem

However, the conventional method has a problem that it is sometimes difficult to automatically assign a label with which the flow data can be analyzed in detail. For example, the method disclosed in NPL 1 can only assign labels at the protocol level, and it is difficult to analyze flow data in detail. Further, the method disclosed in NPL 2 merely identifies the application from the features of the packet data, and it is difficult to analyze the flow data from which less information than the packet data is obtained.

Means for Solving the Problem

In order to solve the problem and attain the object, an identification device includes: a signature generation unit that generates a signature in which header information of packet data included in traffic data is correlated with a label representing a category of an application corresponding to the packet data; a flow data generation unit that generates flow data from the packet data; an assigning unit that assigns a label to the flow data on the basis of the signature and the header information of the flow data; a calculation unit that calculates a feature amount of the flow data; and a learning unit that learns a model that predicts a label from a feature amount using the label and the feature amount of the flow data to which the label is assigned.

Effects of the Invention

According to the present invention, it is possible to automatically assign a label with which flow data can be analyzed in detail.

DESCRIPTION OF EMBODIMENTS

Hereinafter, embodiments of an identification device and an identification program according to the present application will be described in detail with reference to the drawings. The present invention is not limited to the embodiments described below.

Configuration of First Embodiment

An identification device of the first embodiment assigns a label representing the category of an application that generated flow data to the flow data. In addition, the identification device learns a discriminator for predicting the label to be assigned to the flow data. The discriminator is an example of a model that predicts a label from a feature amount.

Figure 1:
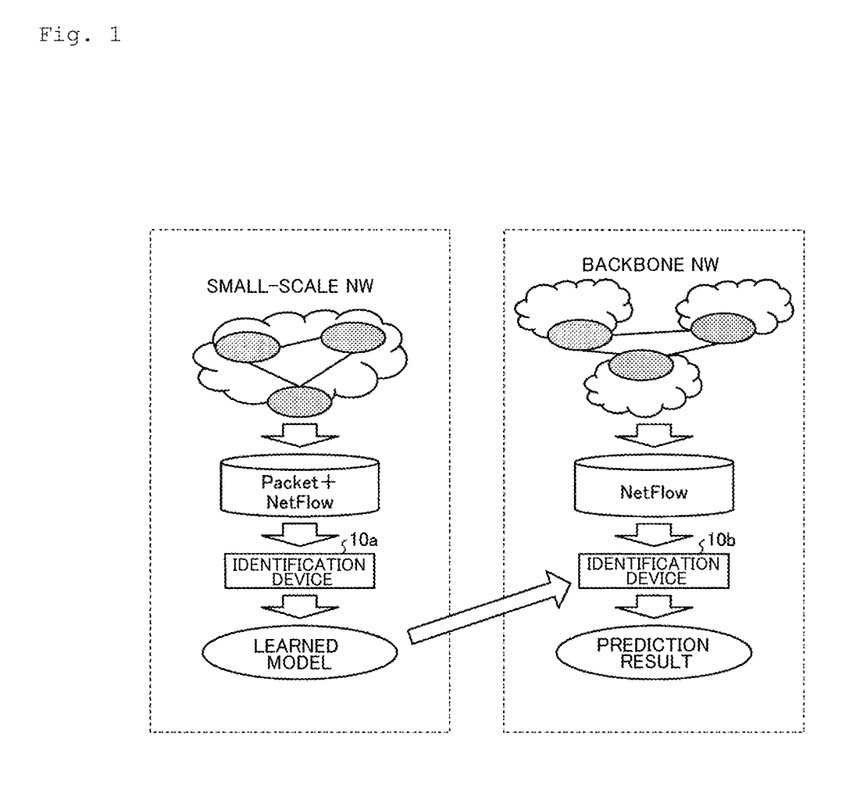
FIG. 1 is a diagram illustrating an example of a configuration of a network system according to a first embodiment.

The configuration of a network system including the identification device will be described with reference to FIG. 1. FIG. 1 is a diagram illustrating an example of a configuration of a network system according to the first embodiment. As illustrated in FIG. 1, an identification device 10*a* receives packet data (Packet) and flow data (Netflow) from a small-scale NW (Network). Then, the identification device 10*a* learns a discriminator using the received packet data and flow data and outputs the learned discriminator.

An identification device 10*b* receives the flow data from a backbone NW. Then, the identification device 10*b* predicts a label to be assigned to the received flow data using the discriminator output by the identification device 10*a*.

As described above, according to the identification device of the first embodiment, it is possible to analyze the flow data of the backbone NW which is a large-scale network using the result of learning in a small-scale network. Furthermore, it is possible to grasp the network state and perform initial analysis when a failure occurs by identifying and visualizing the application from the flow data.

The packet data is information on the header and payload of the packet. In addition, the flow data is statistical information on a packet group (that is, flow) that shares 5-tuple information. For example, the flow data may include calculated values such as the number of packets included in the flow, the number of bytes of each packet, and their average.

When a discriminator is generated by supervised learning in order to identify an application, a large amount of data and labels corresponding to each data point are required. However, the flow data contains only simple information such as an IP address and a port number. For this reason, conventionally, it was difficult to automatically assign a label and the accuracy was low. Further, the larger the scale of a target network, the higher the load on the collection and analysis of packet data, and the more difficult it is to apply in a large-scale network. Therefore, it is useful to identify the category of an application only from the flow data without using the packet data as in the first embodiment.

According to the first embodiment, it is possible to assign a label to the flow data of a large-scale network using a discriminator learned using a small amount of packet data obtained in a small-scale network, for example. In this case, it is not necessary to collect packet data of a large-scale network.

Figure 2:
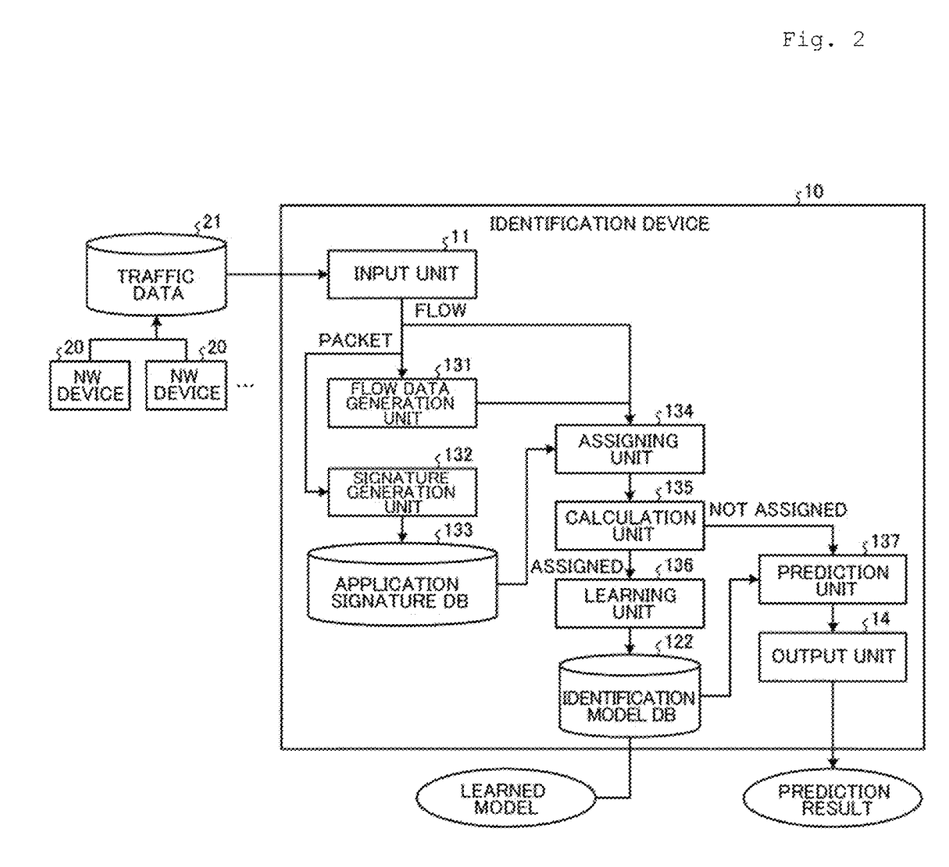
FIG. 2 is a diagram illustrating an example of a configuration of an identification device according to the first embodiment.

The configuration of the identification device according to the first embodiment will be described with reference to FIG. 1. FIG. 1 is a diagram illustrating an example of the configuration of the identification device according to the first embodiment. As illustrated in FIG. 1, the identification device 10 includes an input unit 11, a flow data generation unit 131, a signature generation unit 132, an application signature DB 133, an assigning unit 134, a calculation unit 135, a learning unit 136, an identification model DB 122, a prediction unit 137, and an output unit 14.

Traffic data 21 is input to the input unit 11. The traffic data 21 is packet data and flow data collected from an NW device 20. In the initial state, the generated learned model is stored in the identification model DB 122. The identification device 10 may be generated using random numbers or the like without obtaining a model in the initial state from the outside.

The output unit 14 outputs the predicted value of the label for each piece of flow data as the prediction result. Further, when the model outputs the probability for each label, the output unit 14 may output the prediction probability for each label.

The processing of each processing unit of the identification device 10 will be described separately for a learning phase and a prediction phase. The identification device 10 may be realized by a learning device having a processing unit necessary for learning among the processing units and a prediction device having a processing unit necessary for prediction among the processing units.

(Learning Phase)

In the learning phase, traffic data including packet data and flow data is input to the input unit 11. The flow data generation unit 131 generates flow data from the packet data.

The signature generation unit 132 generates a signature in which the header information of the packet data included in the traffic data is correlated with the label representing the category of the application corresponding to the packet data.

The signature generation unit 132 can identify the category of the application corresponding to the packet data on the basis of the payload information of the packet data. The application corresponding to the packet data is, for example, an application that transmits the packet data to a client and an application that receives the packet data from the client.

The signature generation unit 132 can identify the category of the application corresponding to the packet data on the basis of the information obtained by the analysis of a DPI (Deep Packet Inspection) device. The signature generation unit 132 may have a function equivalent to that of the DPI device.

The signature generation unit 132 generates a signature in which a set of a source IP address, a source port number, a destination IP address, and a destination port number of the packet data is correlated with a label. Then, the signature generation unit 132 stores the generated signature in the application signature DB.

Figure 3:
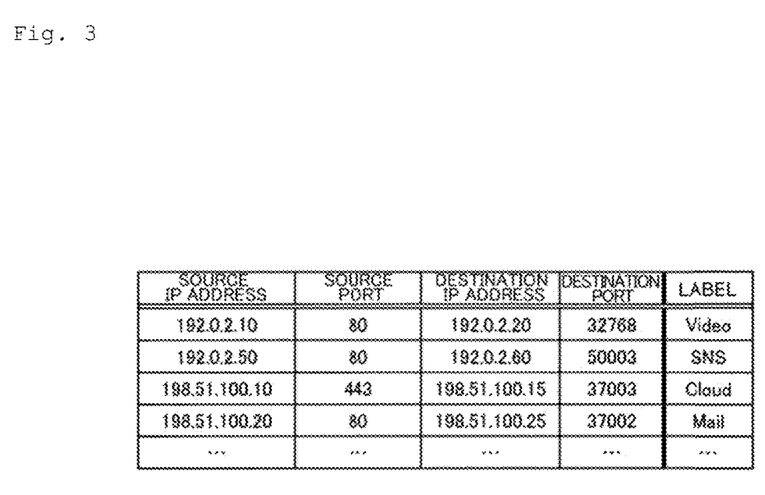
FIG. 3 is a diagram illustrating an example of a signature.

FIG. 3 is a diagram illustrating an example of a signature. As illustrated in FIG. 3, the label representing the application categories is, for example, "Video", "SNS", "Cloud", "Mail", and the like, for example. For example, the signature on the first line of FIG. 3 represents that a label corresponding to packet data or flow data of which the source IP address is "192.0.2.10", the source port number is "80", the destination IP address is "192.0.2.20", and the destination port number is "32768" is "Video".

The assigning unit 134 assigns a label to the flow data on the basis of the signature and the header information of the flow data. For example, the assigning unit 134 refers to the signature illustrated in FIG. 3, and assigns the label "Video" to the flow data of which the source IP address is "192.0.2.10", the source port number is "80", the destination IP address is "192.0.2.20", and the destination port number is "32768".

The calculation unit 135 calculates the feature amount of the flow data. Here, the calculation unit 135 calculates at least one of the number of flows for each source IP address or destination IP address, the average number of bytes transmitted and received per packet, and the number of packets per flow as the feature amount.

The signature generation unit 132 correlates labels for each source IP address, source port number, destination IP address, and destination port number, whereas the calculation unit 135 aggregates the flow data for each source IP address or each destination IP address and calculates the feature amount. By the processing up to this point, the label and the feature amount are correlated with each other.

The learning unit 136 learns a model that predicts a label from the feature amount using the label and the feature amount of the flow data to which the label is assigned. For example, when the model is a DNN that predicts a label from a feature amount, the learning unit 136 learns the DNN. Then, the learning unit 136 stores the updated model parameters in the identification model DB 122. For example, the learning unit 136 stores parameters such as weights and biases for constructing the DNN in the identification model DB 122.

(Prediction Phase)

In the learning phase, traffic data including flow data is input to the input unit 11. Then, the calculation unit 135 calculates the feature amount of the flow data included in the traffic data.

The prediction unit 137 predicts the label corresponding to the flow data using the learned model that predicts the label representing the category of the application from the feature amount. The prediction unit 137 can perform prediction using the DNN constructed on the basis of the parameters stored in the identification model DB.

Figure 4:
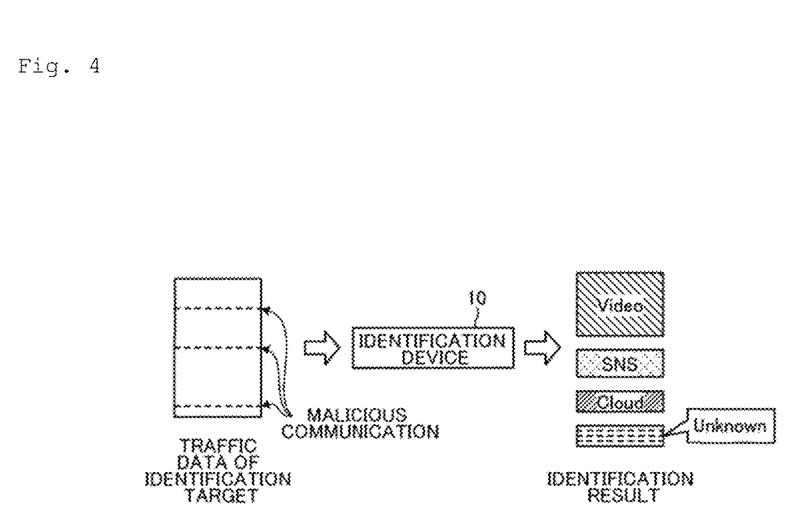
FIG. 4 is a diagram for describing detection of malicious communication.

As illustrated in FIG. 4, according to the processing of the prediction phase of the identification device 10, it is possible to assist the detection of malicious communication. FIG. 4 is a diagram for describing the detection of malicious communication. As illustrated in FIG. 4, traffic data to be identified, which may include malicious communication, is input to the identification device 10. The identification device 10 predicts the label of each piece of traffic data. At this time, there may be traffic data (Unknown) whose label could not be predicted by the identification device 10. At this time, by excluding the traffic data whose label has been predicted, it is possible to efficiently detect malicious communication.

Processing of First Embodiment

Figure 5:
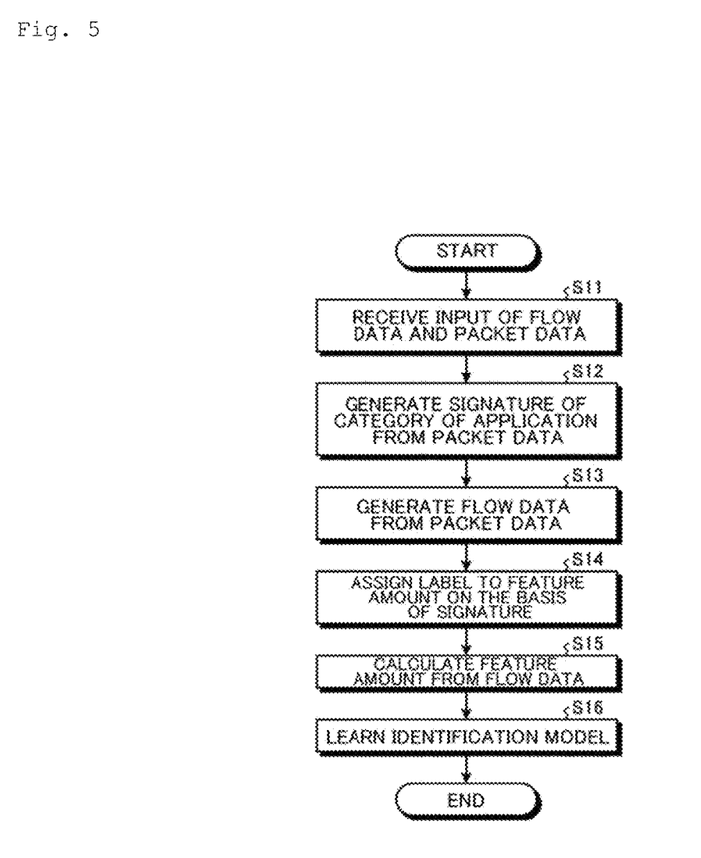
FIG. 5 is a flowchart illustrating the flow of a learning process of the identification device according to the first embodiment.

The flow of the learning process of the identification device 10 will be described with reference to FIG. 5. FIG. 5 is a flowchart illustrating the flow of a learning process of the identification device according to the first embodiment. As illustrated in FIG. 5, first, the identification device 10 receives the input of the flow data and the packet data (step S11). Subsequently, the identification device 10 generates a signature of the category of an application from the packet data (step S12).

Here, the identification device 10 generates flow data from the packet data (step S13). Then, the identification device 10 assigns a label based on the signature to a feature amount (step S14). Further, the identification device 10 calculates a feature amount from the input flow data and the generated flow data (step S15). Then, the identification device 10 learns an identification model using the feature amount to which the label is assigned (step S16).

Figure 6:
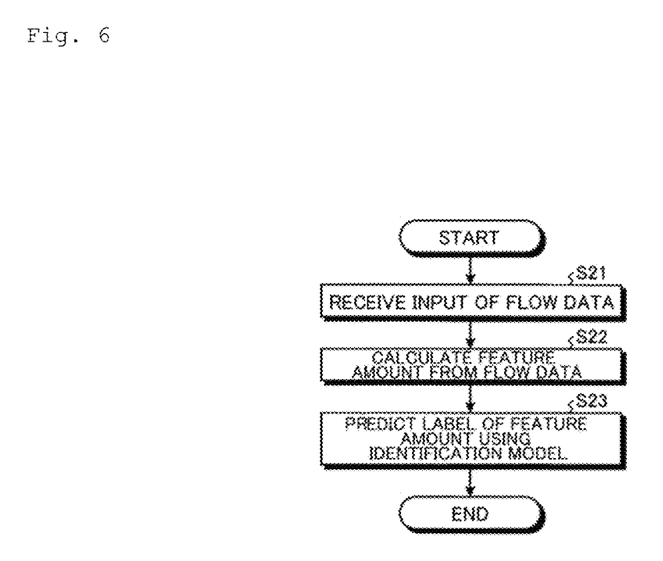
FIG. 6 is a flowchart illustrating the flow of a prediction process of the identification device according to the first embodiment.

The flow of the prediction process of the identification device 10 will be described with reference to FIG. 6. FIG. 6 is a flowchart illustrating the flow of a prediction process of the identification device according to the first embodiment. As illustrated in FIG. 6, first, the identification device 10 receives the input of the flow data (step S21). Subsequently, the identification device 10 calculates a feature amount from the input flow data (step S22). Then, the identification device 10 predicts the label of the feature amount using the identification model (step S23).

Effects of First Embodiment

As described above, the signature generation unit 132 generates a signature in which the header information of the packet data included in the traffic data is correlated with the label representing the category of the application corresponding to the packet data. Further, the flow data generation unit 131 generates flow data from the packet data. Further, the assigning unit 134 assigns a label to the flow data on the basis of the signature and the header information of the flow data. In addition, the calculation unit 135 calculates a feature amount of the flow data. Further, the learning unit 136 learns a model for predicting a label from the feature amount using the label and the feature amount of the flow data to which the label is assigned. In this way, the identification device 10 can generate a model that predicts the label from the flow data by learning using the packet data. Moreover, the predicted labels allow detailed analysis of the flow data. Therefore, according to the first embodiment, it is possible to automatically assign a label with which the flow data can be analyzed in detail.

The calculation unit 135 calculates the feature amount of the flow data included in the traffic data. Further, the prediction unit 137 predicts the label corresponding to the flow data using the learned model that predicts the label representing the category of an application from the feature amount. In this way, the identification device 10 can automatically predict the label of the flow data. Therefore, according to the first embodiment, it is possible to automatically assign a label with which the flow data can be analyzed in detail.

The signature generation unit 132 generates a signature using the payload information of the packet data or the label representing the category identified on the basis of the information obtained by the DPI device analyzing the packet data. In this way, it is possible to identify the category of the application for each feature amount.

The signature generation unit 132 generates a signature in which a set of a source IP address, a source port number, a destination IP address, and a destination port number of the packet data is correlated with a label. These pieces of header information are common to packet data and flow data. Therefore, according to the first embodiment, it is possible to apply the signature generated from the packet data to the flow data.

The learning unit 136 learns the DNN that predicts a label from the feature amount. In this way, it is possible to effectively learn useful features from large-scale data.

The calculation unit 135 calculates at least one of the number of flows for each source IP address or destination IP address, the average number of bytes transmitted and received per packet, and the number of packets per flow as a feature amount. As a result, even if the packet port of the same application changes, the feature amount can be correlated with the category of the application.

[System Configuration and the Like]

The components of the devices illustrated in the drawings are functionally conceptual and are not necessarily physically configured as illustrated in the drawings. In other words, the specific aspects of distribution and integration of the devices are not limited to those illustrated in the drawings. All or part of the components may be distributed or integrated functionally or physically in desired units depending on various kinds of loads and states of use, for example. All or desired part of the processing functions performed by the devices are provided by a CPU or a program analyzed and executed by the CPU or as hardware by wired logic.

All or part of the processes described as being automatically performed among the processes described in the present embodiment may be performed manually. Alternatively, all or part of the processes described as being manually performed may be performed automatically by a known method. In addition, the processing procedures, the control procedures, the specific names, and the information including various kinds of data and parameters described in the present specification and the drawings can be arbitrarily changed unless there is any special mention.

[Program]

As an embodiment, the identification device 10 can be implemented by installing an identification program that executes the learning and prediction as package software or online software in a desired computer. For example, by causing an information processing device to execute the identification program, the information processing device can function as the identification device 10. The information processing device mentioned herein includes a desktop or laptop-type personal computer. In addition, mobile communication terminals such as a smartphone, a cellular phone, or a PHS (Personal Handyphone System), and a slate terminal such as a PDA (Personal Digital Assistant) are included in the category of the information processing device.

Further, the identification device 10 can be implemented as a server device in which the terminal device used by the user is a client and the above-mentioned learning and prediction services are provided to the client. For example, the server device is implemented as a server device that provides a service that receives traffic data and outputs a learned model or a prediction result. In this case, the server device may be implemented as a Web server, or may be implemented as a cloud that provides the above-mentioned learning and prediction services by outsourcing.

Figure 7:
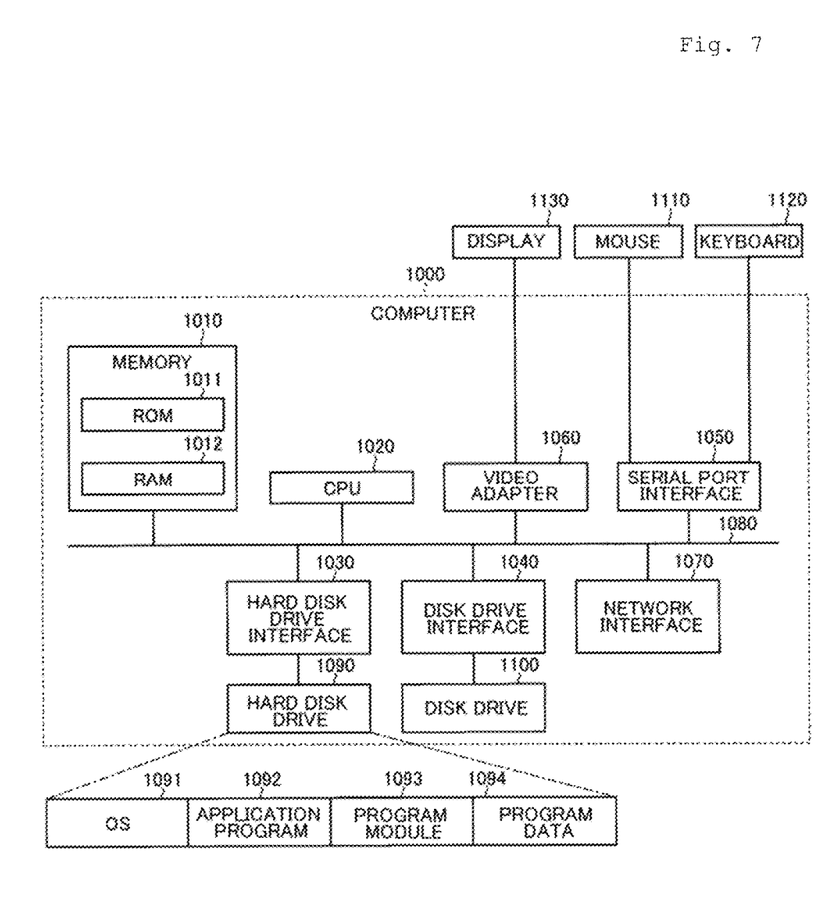
FIG. 7 is a diagram illustrating an example of a computer that executes an identification program.

FIG. 7 is a diagram illustrating an example of a computer that executes an identification program. The computer 1000 has, for example, a memory 1010 and a CPU 1020. The computer 1000 also has a hard disk drive interface 1030, a disk drive interface 1040, a serial port interface 1050, a video adapter 1060, and a network interface 1070. These elements are connected by a bus 1080.

The memory 1010 includes a ROM (Read Only Memory) 1011 and a RAM 1012. The ROM 1011 stores, for example, a boot program such as a BIOS (Basic Input Output System). The hard disk drive interface 1030 is connected to the hard disk drive 1090. The disk drive interface 1040 is connected to the disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected to, for example, the display 1130.

The hard disk drive 1090 stores, for example, the OS 1091, the application program 1092, the program module 1093, and the program data 1094. That is, the program that defines each process of the identification device 10 is implemented as a program module 1093 in which a code that can be executed by a computer is described. The program module 1093 is stored in the hard disk drive 1090, for example. For example, the program module 1093 for executing a process similar to the functional configuration in the identification device 10 is stored in the hard disk drive 1090. The hard disk drive 1090 may be replaced by an SSD.

Further, the setting data used in the processing of the above-described embodiment is stored in a memory 1010 or a hard disk drive 1090 as program data 1094, for example. The CPU 1020 reads the program module 1093 and the program data 1094 stored in the memory 1010 and the hard disk drive 1090 into the RAM 1012 as needed, and executes the processing of the above-described embodiment.

The program module 1093 and the program data 1094 are not limited to the case where they are stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (LAN (Local Area Network), WAN (Wide Area Network), and the like). Then, the program module 1093 and the program data 1094 may be read by the CPU 1020 from another computer via the network interface 1070.

REFERENCE SIGNS LIST

10 Identification device
11 Input unit
14 Output unit
122 Identification model DB
131 Flow data generation unit
132 Signature generation unit
133 Application signature DB
134 Assigning unit
135 Calculation unit
136 Learning unit
137 Prediction unit

The invention claimed is:

1. An identification device, comprising:
signature generation circuitry that generates a signature in which packet header information of packet data included in traffic data is correlated with a category label representing a category of an application corresponding to the packet data;
flow data generation circuitry that generates flow data from the packet data;
assigning circuitry that assigns a flow data label to the flow data on the basis of the signature and flow data header information of the flow data;
calculation circuitry that calculates a feature amount of the flow data; and
learning circuitry that learns a model that predicts a feature amount label from the feature amount of the flow data using the flow data label and the feature amount of the flow data to which the flow data label is assigned.

2. The identification device according to claim 1, wherein:
the signature generation circuitry generates the signature using the category label representing a category identified on the basis of payload information of the packet data or information obtained by a DPI (Deep Packet Inspection) device analyzing the packet data.

3. The identification device according to claim 1, wherein:
the signature generation circuitry generates the signature in which the category label is correlated with a set of a source IP address, a source port number, a destination IP address, and a destination port number of the packet data.

4. The identification device according to claim 1, wherein:
the learning circuitry learns a DNN (Deep Neural Network) that predicts the feature amount label from the feature amount of the flow data.

5. The identification device according to claim 1, wherein:
the calculation circuitry calculates at least one of a number of flows for each source IP address or destination IP address, an average number of bytes transmitted and received per packet, and a number of packets per flow as the feature amount of the flow data.

6. A non-transitory computer readable medium including computer instructions for causing a computer to function as the identification device according to claim 1.

7. An identification device comprising:
calculation circuitry that calculates a feature amount of flow data included in traffic data; and
prediction circuitry that predicts a prediction label corresponding to the flow data representing a category of an application from the feature amount using a learned model.

* * * * *